United States Patent Office 3,428,336
Patented Feb. 18, 1969

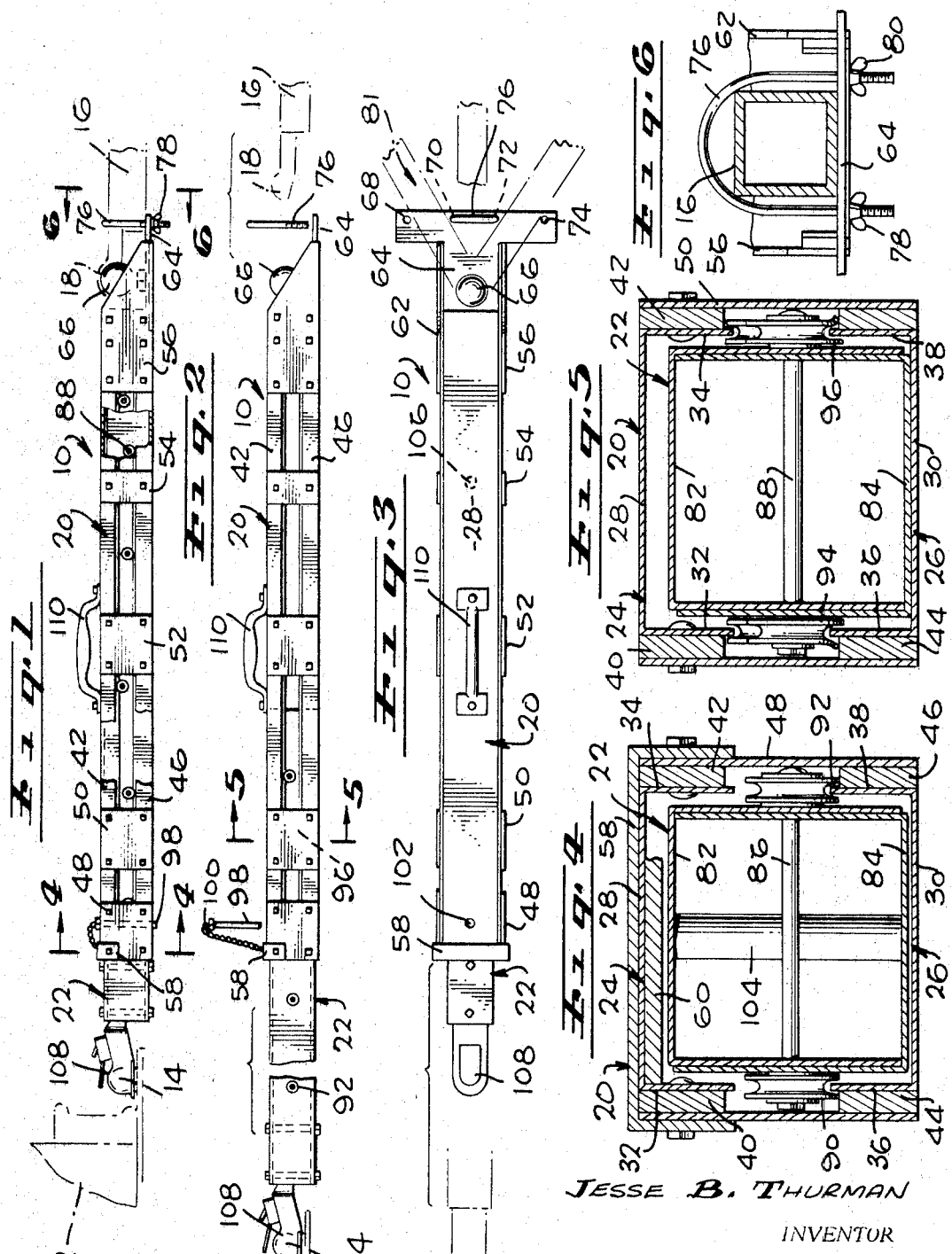

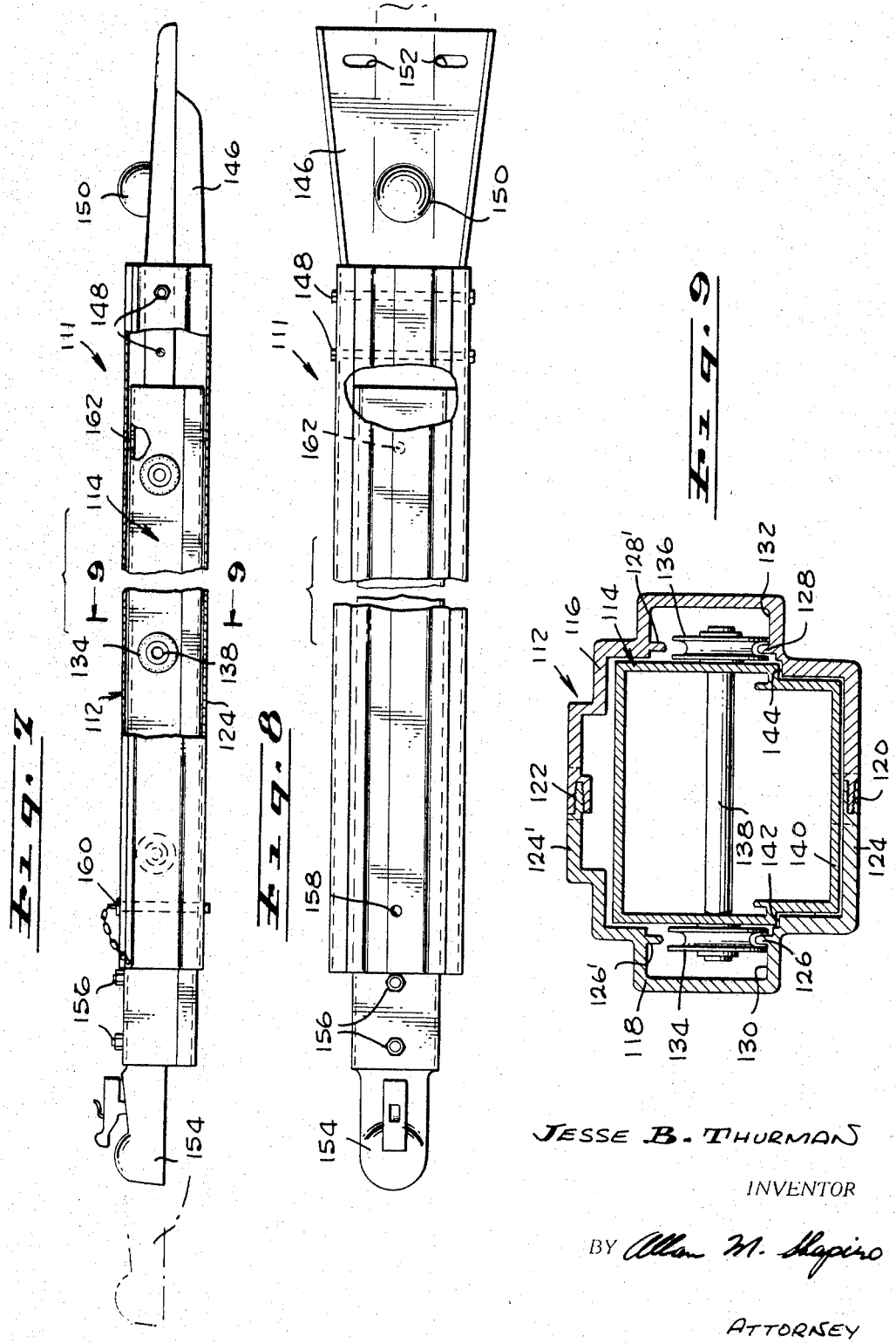

3,428,336
BOAT TRAILER TONGUE EXTENSION
APPARATUS
Jesse B. Thurman, 1010 North Ave. 49,
Los Angeles, Calif. 90042
Continuation-in-part of abandoned application Ser.
No. 618,095, Feb. 23, 1967. This application Feb.
26, 1968, Ser. No. 714,394
U.S. Cl. 280—482                  17 Claims
Int. Cl. B60d 1/00, 1/06

ABSTRACT OF THE DISCLOSURE

A separate unit having a ball on one end and a ball socket on the other end is arranged to be interconnected between the trailer hitch on a vehicle and the front end of a trailer to extend the distance therebetween. The extension apparatus is secured to the trailer by securement means in addition to the ball and socket on that end. Furthermore, the tongue extension apparatus is provided with two telescoping tubes so that it may be used either in the shortened or lengthened position and it may be carried and stored in the shortened position. One of the tubes carries tracks and the other carries rollers in engagement with the tracks so that telescoping can be easily accomplished. The rollers are preferably of pliable material so that when loaded, they deform and mechanical engagement between the tubes carries loads which are not longitudinal of the apparatus.

CROSS REFERENCE

This application is a continuation-in-part of patent application, Ser. No. 618,095, filed Feb. 23, 1967, now abandoned, by Jesse B. Thurman for Boat Trailer Tongue Extension Apparatus.

BACKGROUND OF THE INVENTION

Field of the invention

The boat trailer tongue extension apparatus of this invention relates to the interconnection between a self-propelled vehicle and a trailer connectable to the vehicle for towing thereby and is a structure separate from the trailer which is installed between the two units when extension is desired.

Description of the prior art

The concept of extending the length between the main load carrying body of the trailer and its ball socket connectable to a towing vehicle is well known. However, all prior concepts involve prior incorparation of telescoping apparatus into the trailer structure. The closest examples of the prior art to the present boat trailer tongue extension apparatus are found in Fetzko Patent No. 3,155,399 and Moody et al. Patent No. 3,083,986. Since all of the known prior art includes incorporation of the telescoping structure into the trailer frame, it can only be used in one trailer. It does not have utility for another trailer. Furthermore, building such structure into the trailer increases its cost, weight and complexity while at the same time reducing the universal application of the telescoping apparatus, as noted above.

The prior telescoping apparatus has not solved the problem of making telescoping easy and smooth. In at least one prior patent, rollers have been used between the telescoping members. However, these rollers must carry all of the transverse load between the two telescoping parts, and thus must be sturdy, large rollers on heavy axles. The boat trailer tongue extension apparatus of this invention relies upon light rollers for extensibility. These rollers are merely guide rollers under no load conditions, and as soon as load is applied, the rollers deform to permit metal to metal engagement between the tubular telescoping members of the extension apparatus.

SUMMARY OF THE INVENTION

This invention is directed to a boat trailer tongue extension apparatus and particularly an apparatus which is separate from any particular trailer, but can be attached to any trailer for use therewith when extension requirements are at hand. The apparatus comprises telescoping members. A ball is mounted upon one of the telescoping members and a ball socket on the other so that they can be respectively fitted to the front end of the trailer and the rear end of a towing vehicle. The telescoping members are arranged for telescoping from a shortened, storage position to an elongated, use position. Rollers interengage between the telescoping members to permit ease of extension and closing of the telescoping members with respect to each other. These rollers are suitably arranged with respect to guide tracks built into the members. Preferably, rather than carry the full transverse loads that may occur upon the extension apparatus, the rollers are made of resilient material so that they can deform and permit metal to metal contact between the extension members. Thus, light rollers can be used, and these rollers still provide for low friction extension and closing.

This structure overcomes the disadvantages of those prior art structures wherein no rollers are used, for the extension is easily accomplished in the present boat trailer tongue extension apparatus. Since the present trailer tongue extension apparatus is independent of the trailer, and is only applied to the trailer when the extension is desired, it overcomes the unnecessary complexity of the prior trailer incorporated structures. Furthermore, since it is installed as a separate unit between the trailer and the towing vehicle, it is thus portable and is applicable to any trailer for which tongue extension is desired.

Accordingly, it is an object of this invention to provide a boat trailer tongue extension apparatus which is a separate unit and which can be installed between any trailer and towing vehicle to provide a tongue extension therefore, independent of the trailer structure.

It is a further object of this invention to provide a telescoping trailer tongue extension apparatus wherein the apparatus can be extended while in use, and can be closed for storage, and for those cases where the full length extension in use is not required.

It is still another object of this invention to provide a trailer tongue extension apparatus wherein rollers are provided between telescoping members so that the members can be easily telescoped with respect to each other and to further provide a structure wherein roller deformation permits metal to metal contact between the telescoping members upon loads thereon, so that the rollers do not need to carry the full loads involved.

It is still another object of this invention to provide a trailer tongue extension apparatus which is economic and easy to use so that it can be used in trouble-free and widespread manner.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGURE 1 is a side elevational view of the first embodiment of the boat trailer tongue extension apparatus of this invention as shown in its closed position;

FIGURE 2 is a side elevational view thereof showing the apparatus in its extended position;

FIGURE 3 is a top plan view of the apparatus showing it in its closed position;

FIGURE 4 is an enlarged sectional view taken along line 4—4 of FIGURE 1;

FIGURE 5 is an enlarged sectional view taken along line 5—5 of FIGURE 2;

FIGURE 6 is an enlarged sectional view taken along line 6—6 of FIGURE 1;

FIGURE 7 is a side elevational view of the second embodiment of the boat trailer tongue extension apparatus of this invention as shown in its closed position, with parts broken away;

FIGURE 8 is a top plan view thereof; and

FIGURE 9 is an enlarged transverse section through the center thereof.

DESCRIPTION OF THE PREFERRED EMBODIMENTS

The trailer tongue extension apparatus of the first embodiment is generally indicated in FIGURES 1–3 by the reference numeral 10. The trailer tongue extension apparatus 10 is usable between a towing vehicle 12 which is equipped with a conventional ball 14 and a trailer 16 having a conventional ball socket 18. In normal towing of the trailer 16 upon the highway, while socket 18 is engaged over ball 14, the towing vehicle 12 and the trailer 16 are directly coupled. The tongue extension apparatus 10 is only installed in those special circumstances where an increased length of trailer tongue is required or desired, and the tongue extension apparatus 10 is not designed or intended for highway use.

Tongue extension apparatus 10 comprises telescoping members 20 and 22. As is best seen in FIGURES 4 and 5, telescoping member 20 is comprised of channels 24 and 26. These channels have webs 28 and 30, respectively. Flanges 32 and 34 are formed as a part of channel 24 while flanges 36 and 38 are formed as part of channel 26. Flanges 32 and 36 face each other, as do flanges 34 and 38. These flanges have their edges spaced from each other and form roller tracks. Longitudinal strengthening bars 40, 42, 44 and 46 are respectively secured to the outer faces of flanges 32, 34, 36 and 38. The strengthening bars extend from the outer face of the webs of the channels, but do not extend as far as the flange edges so that the flange edges extend past the longitudinal strengthening bars as guide rails. Side plates 48, 50, 52, 54 and 56 are secured along the length of the longitudinal strengthening bars 42 and 46 on the near side of the tongue extension apparatus 10 as is seen in FIGURE 1. Similar side plates are secured to the longitudinally strengthening bars 40 and 44 on the other side of the tongue extension apparatus 10. The channels, longitudinal strengthening bars and side plates are secured together by any convenient means, such as bolting, welding or riveting. Bolts are shown.

Additionally, telescoping member 20 includes strengthening strap 58 on its left end, and directly beneath strengthening strap 58 is filler bar 60. The right end of telescoping member 20 has its side plate 56 gusseted to extend to the right. The corresponding side plate 62 is provided upon the far side of telescoping member 20. Floor plate 64 is positioned between these side plates and serves as a base on which ball 66 is secured. Floor plate 64 extends in the shape of a T, as is seen in FIGURE 3, with the cross bar extending beyond the limits of side plates 56 and 62. Suitable holes are positioned in floor plate 64. As is shown in FIGURE 3, there are preferably four such holes shown at 68, 70, 72 and 74. These holes are spaced so that U bolt 76 can be placed through adjacent pairs of holes.

Conventional boat trailers have a single tongue, such as is illustrated with respect to trailer 16 and the ball socket 18 is secured to the end of this tongue. As is illustrated in FIGURE 1, ball socket 18 is adapted to be placed upon ball 66. U bolt 76 is of such dimension as to fit over the tongue and through the holes 70 and 72. It is secured in place by means of wing nuts 78 and 80 (see FIGURE 6) to clamp the tongue of trailer 16 onto floor plate 64. In such a position, the tongue extension apparatus 10 is a secure extension of the trailer tongue. For those cases in which the front of the trailer has a pair of converging bars which form the tongue thereof, as is illustrated with respect to trailer 81 in FIGURE 3, pairs of U bolts are respectively inserted over the bars of that tongue into the pairs of holes 68 and 70, and 72 and 74 to securely clamp the tongue extension apparatus 10 to the trailer tongue.

As is best seen in FIGURES 4 and 5, telescoping member 22 comprises a pair of channels 82 and 84. These channels have flanges which fully overlap to provide a tube having double side walls. Thus, there is double strength in the side walls of telescoping member 22. A plurality of axles extend across telescoping member 22 through the flanges of the channel thereof. Axles 86 and 88 are indicated in FIGURES 4 and 5. Guide wheels 90, 92, 94 and 96 are carried on these axles. These guide wheels have spaced flanges and are arranged so that the flanges ride upon the longitudinal strengthening bars and the wheel flanges are guided by the flanges of channels 24 and 26. As is indicated in FIGURES 1, 2 and 5, the various axles positioned along the length of telescoping member 22 are arranged so that some of the guide wheels are guided with respect to the upper flanges and longitudinal strengthening bars, while others are guided by the lower longitudinal strengthening bars and flanges.

Guide wheels 90, 92, 94 and 96, and the further guide wheels in the structure, are made of resilient polymer composition material. Nylon, polyethylene and polypropylene are each suitable. The basic requirement is that the flanges and guide wheels be sufficiently resilient so that they resiliently bend away to permit some up and down motion between telescoping members 20 and 22. However, the flanges are sufficiently stiff so that, without external loads, the telescoping members are maintained in rolling engagement with each other. Each of the guide wheels is mounted on its axle in such a manner that it easily turns upon its axle. For minimum friction, and in a preferred embodiment, each of the guide wheels is equipped with an anti-friction bearing.

The space between the web of channel 84 and the web of channel 26 is small when the guide wheels are rolling on their flanges. Similarly, the space between the web of channel 82 and the lower side of filler bar 60 is small in the same situation, as is seen in FIGURE 4. Thus, when additional vertical loads are applied, the wheel flanges distort and resiliently bend out of the way so that there is metal to metal contact. This is illustrated in FIGURE 5 wherein the webs of channels 26 and 84 are in engagement. This is the situation when there is a downward load on the center of the tongue extension apparatus 10. Similarly, in this situation, at the filler bar 60 the web of channel 82 rises and comes into metal to metal contact with filler bar 60.

In order to maintain the tongue extension apparatus in its extended or in its closed position, as desired, pin 98 is provided. If desired, it can be secured to member 20 by means of chain 100. Hole 102 extends through the webs of channels 24 and 26 and this hole is of appropriate size to accept pin 98. Corresponding holes extend through the webs of channels 82 and 84 in telescoping member 82. One of such holes in member 22 is positioned in alignment with hole 102 when the members are in their closed position, and another is positioned in alignment with hole 102 at the position of maximum desired extension of the telescoping members 20 and 22. As illustrated in FIGURE 4, tube 104 connects the holes in the webs of channels 82 and 84 when the members are in their closed position, and a similar tube 106, (see FIGURE 3) interconnects similar holes when the members are in their maximum desired extension position. These tubes guide pin 98 in proper engagement through the holes and also strengthen the tube at this point to give it maximum strength for towing purposes.

The left end of telescoping member 22 carries ball socket 108 which is adapted to be secured upon ball 14. That end of member 22 can be strengthened in any desired manner to properly attach ball socket 108.

Referring to FIGURES 7, 8 and 9, a second and preferred embodiment of the boat trailer tongue extension apparatus is generally indicated at 111. The tongue extension apparatus 111 comprises outer telescoping member 112 and inner telescoping member 114. These telescoping members are identical to the telescoping members 20 and 22 in their function, and differ in their structure only in that they are formed of extruded shapes rather than built-up shapes. As is best seen in FIGURE 9, outer telescoping member 112 is made of extrusions 116 and 118. The extrusions are permanently joined together by means of tongue and groove joints, with both the tongue and groove each having somewhat of a Christmas-tree shape so that, when they are driven together, they remain permanently attached and become a unitary structure. The lower tongue is shown at 120 while the upper tongue is shown at 122. They mate in complementary grooves. After they are joined, as is seen in FIGURE 9, they resemble the facing channels of the embodiment shown in FIGURES 1 through 6. Lower web 124 is formed with upwardly facing tracks 126 and 128, while upper web 124' is formed with downwardly facing tracks 126' and 128'. Flats 130 and 132 respectively extend on one (as shown) or both sides of tracks 126 and 128 to be engaged by the wheel flanges of wheels 134 and 136, respectively.

Inner telescoping member 114 is substantially a box section, and may be extruded in one or two pieces, whichever is preferred. If extruded in two pieces, it can be assembled into a permanent unitary structure by means of Christmas-tree tongue and groove joints, similar to the joints in outer telescoping member 112. Shaft 138 extends through inner telescoping member 114 and carries wheels 134 and 136 on the ends thereof. The wheels are suitably retained thereon, as by snap rings or the like. A plurality of such shafts and such wheels are provided along the length of inner telescoping member 114 to provide substantially anti-friction guidance of the telescoping members with respect to each other, under no-load conditions. However, again, the wheels 134 and 136 are made of resilient material so that a vertical load will cause deflection of the wheel flanges to permit metal to metal engagement between the telescoping members to provide a rigid, load-bearing situation. The metal to metal contact is provided by the closeness of the lower web 140 of the inner telescoping member 114 to the lower web 124 of the outer telescoping member 112. Additionally, in this embodiment, offsets 142 and 144 are provided in both the inner and outer telescoping members to provide additional intermetallic contact upon such deflection.

Floor plate 146 is provided with side flanges to extend into and fit closely adjacent within the right end of outer telescoping member 112. It is provided with through bolts 148 to secure these side flanges within the telescoping member. Floor plate 146 carries ball 150, similar to ball 66 in the earlier embodiment, for reception by the socket on the trailer. Furthermore, floor plate 146 has slots 152 therein for the clamping of the trailer tongue to the floor plate by means of the U bolt, such as has been previously described.

The left end of inner telescoping member 114 has the shank of ball socket 154 inserted therein and secured by means of bolts 156. Again, the shank is preferably shaped to engage a substantial area of the interior surface of inner telescoping member 114 so as to provide a strong joint. Both telescoping members have an aligned hole 158 therethrough in which pin 160 is inserted to retain the telescoping members in their shortened position shown in FIGURE 7. However, similarly to the earlier described embodiment, inner telescoping member 114 has an additional hole 162 therethrough so that, upon removal of pin 160 and outward telescoping of the inner telescoping member 114 to the left until hole 162 is aligned with hole 158 in the outer telescoping member, the pin 160 can be inserted to retain these sections in their extended position. In both positions, the two telescoping members are thus rigidly secured to each other, in metal to metal contact whenever any load is applied.

The boat trailer tongue extension apparatus 111 is used identically to the boat trailer tongue extension apparatus 10, as is described below.

When trailer 16 is being towed upon the highway, ball socket 18 is engaged over ball 14 so that the towing vehicle 12 and its trailer are close coupled. It is undesirable in highway use to have a longer coupling than is absolutely necessary, for such a coupling causes the trailer to follow less well, to cut corners closer, and to make driving and maneuvering more difficult. Furthermore, passing such an elongated unit is more dangerous and it is conceivable in some cases that the overall length would exceed the legal highway length limit. Thus, while driving on the highway, the trailer tongue extension apparatus 10 is not in use but is stored in its closed position in the towing vehicle or on the trailer.

When the combination of vehicles reaches the destination where lengthening of the tongue is desired, the vehicles are stopped and socket 18 is removed from ball 14. This separates the trailer 16 from the towing vehicle 12. The towing vehicle 12 is moved a reasonable distance away and the trailer tongue extension apparatus 10 is brought from its storage location. Handle 110 aids in this conveyance. Ball socket 18 is then engaged upon ball 66 to secure tongue extension apparatus 10 to the trailer. U bolt 76 is passed down through the appropriate holes to clamp the trailer tongue upon floor plate 64. Wing nuts 78 and 80 are tightened to provide a firm attachment.

Pin 98 is withdrawn at this time and telescoping member 22 is pulled out of telescoping member 20 to the desired distance. There are alternative methods of operation at this point. In the first case, ball socket 108 is installed over ball 14, as is shown in FIGURE 2, and then the towing vehicle 12 is moved out until tube 106 aligns with hole 102. At this time, pin 98 is reinstalled with the telescoping members in the extended position. On the other hand, the telescoping members can be extended to this position and the towing vehicle 12 maneuvered to place ball 14 under ball socket 108, followed by attachment of the ball and socket. Now the trailer tongue extension apparatus is connected between the trailer and towing vehicle and is locked in its extended position. Thereupon, the operator backs the combined unit so that the trailer moves into position.

In the preferred embodiment, the trailer is a boat trailer which is backed into the water at a boat launching ramp. The apparatus 10 keeps the towing vehicle away from the water while the trailer 16 goes far enough into the water to provide good launching conditions. After the boat launching operation, or the loading of the boat upon the trailer are complete, towing vehicle 12 moves forward to pull the trailer out of the water. The trailer is moved to level ground and trailer tongue extension apparatus 10 is removed by the reverse of the preceding operations. Socket 108 is removed from ball 14, pin 98 is removed and the telescoping members are closed and maintained in the closed position by reinsertion of pin 98 through the hole 102 and tube 104. Thereafter, U bolt 76 is removed and ball 66 is taken from socket 18. At this time, towing vehicle 12 is backed up and socket 18 is installed upon ball 14 so that the pair of vehicles are again ready for highway travel.

As has been previously described, for those trailers such as trailer 81, having a pair of converging front tongue members, a pair of U bolts 76 are used in the appropriate holes to provide rigid clamping conditions.

It is clear that when in use, certain vertical or side loads may occur on a trailer tongue extension apparatus 10. When these occur, the flanges of the guide wheels deflect as is shown in FIGURE 5 so that metal to metal contact occurs between the telescoping members and the guide wheels are not required to carry the loads. Thus, they are available for easy extension and closing of the telescoping members but need not be so heavy as to carry the larger loads placed upon the structure when in use.

It is clear from the detailed description of this structure that it is eminently suited to the purpose. It is made out of very light members so that it is light and easy to carry and store. Strengthening members are positioned where needed, but the lightest metal is used where loads are light. Strengthening bars 40, 42, 44 and 46 are positioned in such a manner as to greatly strengthen telescoping member 20 so that it is of optimum character for vertical beam loading. Similarly, the double side flanges of the telescoping member 22 are also eminent for this purpose.

What is claimed is:

1. A trailer tongue extension apparatus comprising:
    first and second telescoping members each having inner and outer ends, one of said telescoping members having a ball socket on its outer end and the other of said telescoping members having a ball on its outer end, said inner end of said second telescoping member being inserted within said inner end of said first telescoping member so that the distance between said ball socket and said ball can be adjusted by telescoping of said members with respect to each other; and
    a track formed on one of said telescoping members and a roller rotatably mounted upon the other of said telescoping members, said roller being in engagement with said track so that, upon telescoping of said members with respect to each other, said roller rolls upon said track.

2. The trailer tongue extension apparatus of claim 1 wherein:
    said first telescoping member is formed with facing flanges each one of which forms a track and there are a plurality of said rollers on said second telescoping member, said rollers being in engagement with said track flanges so as to guide said first telescoping member with respect to said second telescoping member.

3. The trailer tongue extension apparatus of claim 2 wherein:
    said first telescoping member is formed with flat faces positioned adjacent said tracks and said rollers have flanges, said roller flanges engaging with said flat faces adjacent said track flanges.

4. The trailer tongue extension apparatus of claim 3 wherein:
    said first and second telescoping members are spaced from each other but lie in close proximity to each other when said roller flanges are in rolling engagement with said flat faces.

5. The trailer tongue extension apparatus of claim 2 wherein:
    said rollers have flanges and said flanges are made of resilient material so that, upon application of transverse loads upon said trailer tongue extension apparatus, said roller flanges deflect and said first and second telescoping members move into direct load bearing contact.

6. The trailer tongue extension apparatus of claim 5 wherein:
    said rollers are made of synthetic polymer composition material.

7. The trailer tongue extension apparatus of claim 5 wherein:
    some of said rollers are in engagement with flange edges of a first channel and some of said rollers are in engagement with flange edges of a second channel.

8. A trailer tongue extension apparatus, said trailer tongue extension apparatus comprising:
    first and second telescoping members each having inner and outer ends, one of said telescoping members having a ball socket on its outer end and the other of said telescoping members having a ball on its outer end, said inner end of said second telescoping member being inserted within said inner end of said first telescoping member so that the distance between said ball socket and said ball can be adjusted by telescoping of said members with respect to each other, the improvement comprising:
    said first telescoping member being formed of first and second channels, said first and second channels having substantially parallel webs and having flanges, said flanges having edges, said edges of said flanges being spaced from each other; and
    rollers on said second telescoping member, said rollers being in engagement with said flanges so as to guide said first telescoping member with respect to said second telescoping member.

9. The trailer tongue extension apparatus of claim 8 wherein:
    longitudinal strengthening bars are secured to said flanges and said rollers have flanges, said longitudinal strengthening bars extending almost to said edges of said channel flanges so that said roller flanges engage with said longitudinal strengthening bars.

10. The trailer tongue extension apparatus of claim 9 wherein:
    said first and second telescoping members are spaced from each other but lie in close proximity to each other when said roller flanges are in rolling engagement with said longiitudinal strengthening members.

11. The trailer tongue extension apparatus of claim 10 wherein:
    said roller flanges are made of resilient material so that upon application of transverse loads upon said trailer tongue extension apparatus, said roller flanges deflect and said first and second telescoping members move into direct load bearing contact.

12. The trailer tongue extension apparatus of claim 11 wherein:
    said rollers are made of synthetic polymer composition material.

13. The trailer tongue extension apparatus of claim 8 wherein:
    some of said rollers are in engagement with flange edges of said first channel and some of said rollers are in engagement with flange edges of said second channel.

14. The trailer tongue extension apparatus of claim 8 wherein:
    said first telescoping member has at least one opening therein and said second member has at least one opening therein, said openings in said first and second telescoping members being in alignment when said second member is extended with respect to said first member; and
    a pin positionable in said openings in said first and second members to retain said first and second members in their extended position.

15. The trailer tongue extension apparatus of claim 14 wherein:
    said opening through said second telescoping member comprises a tube extending from the bottom to the top of said second telescoping member.

16. The trailer tongue extension apparatus of claim 8 wherein:
    securing means is positioned on said first telescoping member, said securing means being arranged to engage a trailer tongue and clamp the trailer tongue with respect to said first telescoping member.

17. The trailer tongue extension apparatus of claim 16 wherein:

said securing means comprises a U bolt, said U bolt extending through said first telescoping member and being arranged to engage around a trailer tongue.

References Cited

UNITED STATES PATENTS

| | | | |
|---|---|---|---|
| 2,425,838 | 8/1947 | Schultz | 280—482 |
| 3,032,353 | 5/1962 | Williams et al. | 280—482 X |
| 3,083,986 | 4/1963 | Moody et al. | 280—482 X |
| 3,155,399 | 11/1964 | Fetzko | 280—482 |
| 3,252,717 | 5/1966 | Hustead | 280—482 |
| 3,284,101 | 11/1966 | Arnold | 280—482 |

FOREIGN PATENTS 1,091,928  11/1954  France.

LEO FRIAGLIA, *Primary Examiner.*

U.S. Cl. X.R.

280—491